United States Patent
Izzolo, Jr.

(10) Patent No.: US 9,555,275 B1
(45) Date of Patent: Jan. 31, 2017

(54) RESILIENT HAND PAD AND BLOCK SYSTEM FOR RELIEVING HAND AND WRIST STRESS, AND RELATED PAIN, DURING YOGA AND RELATED FLOOR-BASED POSES AND EXERCISES

(71) Applicant: Michael Leonard Izzolo, Jr., Palm City, FL (US)

(72) Inventor: Michael Leonard Izzolo, Jr., Palm City, FL (US)

( * ) Notice: Subject to any disclaimer, the term of this patent is extended or adjusted under 35 U.S.C. 154(b) by 0 days.

(21) Appl. No.: 14/685,305

(22) Filed: Apr. 13, 2015

(51) Int. Cl.
*A63B 21/00* (2006.01)

(52) U.S. Cl.
CPC ...... *A63B 21/00047* (2013.01); *A63B 2209/14* (2013.01)

(58) Field of Classification Search
CPC .............. A63B 21/4035; A63B 26/003; A63B 21/00047; A63B 2210/50; A63B 21/068; A63B 2208/0219; A63B 2208/0214; A63B 2208/0295; A63B 23/16; A63B 21/4025; A63B 23/14; A63B 21/4019; A63B 21/028; A63B 26/00; A47L 13/18; A47L 13/19; A47L 13/16; A47L 23/10; A47L 25/08; A47L 13/17; A47L 1/15; A47L 21/04; A47L 23/04
USPC .................. 482/4–49, 131–139, 142; 15/227
See application file for complete search history.

(56) References Cited

U.S. PATENT DOCUMENTS

| | | | |
|---|---|---|---|
| 1,314,053 A | 8/1919 | Eissler | |
| 1,477,460 A * | 12/1923 | Smith | A63B 60/40 473/518 |
| 1,528,026 A | 3/1925 | Pease | |
| 1,994,425 A * | 3/1935 | Weller | A47L 13/19 15/104.94 |
| 2,071,365 A * | 2/1937 | Stroop | A47L 13/19 15/104.94 |
| 2,159,972 A * | 5/1939 | Larson | A63B 31/08 441/58 |
| 2,256,098 A | 9/1941 | Mauldin | |
| 2,994,530 A * | 8/1961 | Cohan | A63D 5/00 473/55 |
| 3,295,518 A * | 1/1967 | Hazlewood | A61M 5/52 128/877 |
| 4,441,487 A * | 4/1984 | Daugherty | A61H 23/0218 132/73 |
| 4,516,774 A | 5/1985 | Nankivell | |
| 4,613,131 A | 9/1986 | Anderson | |
| 4,977,621 A * | 12/1990 | Richard | A41D 13/082 2/161.1 |
| 5,127,127 A * | 7/1992 | Jarosinski | A47L 13/18 15/104.94 |
| 5,209,490 A * | 5/1993 | Dallavecchia | A63B 59/20 273/348.4 |
| 5,256,136 A * | 10/1993 | Sucher | A61F 13/104 128/879 |

(Continued)

FOREIGN PATENT DOCUMENTS

DE 202004000588 U1 5/2004

*Primary Examiner* — Andrew S Lo
(74) *Attorney, Agent, or Firm* — Glenn E. Gold; Glenn E. Gold, P.A.

(57) ABSTRACT

A hand pad for stabilizing and supporting on a floor or other surface the hand of a user during stationary and dynamic exercises includes a body having a top surface defining a debossed profile of a human hand for receiving therein the hand of a user, and a bottom surface having a slip-resistant texture.

21 Claims, 8 Drawing Sheets

(56) References Cited

U.S. PATENT DOCUMENTS

| | | | | |
|---|---|---|---|---|
| 5,562,270 A | * | 10/1996 | Montague | A47B 21/0371 248/118.1 |
| 5,956,770 A | * | 9/1999 | Dennis | A47L 13/18 15/227 |
| 6,093,159 A | * | 7/2000 | Racoosin | A61H 15/0092 601/118 |
| 6,315,696 B1 | * | 11/2001 | Garrioch | A61H 23/04 482/44 |
| 6,482,168 B1 | | 11/2002 | Betcher | |
| 6,487,726 B1 | * | 12/2002 | Sitiku | A46B 5/04 2/158 |
| 6,766,536 B1 | | 7/2004 | Aarons | |
| 6,935,382 B2 | | 8/2005 | Buckley | |
| 7,108,635 B2 | | 9/2006 | Howlett-Campanella | |
| 7,494,395 B2 | * | 2/2009 | Krikliwy | A63B 31/10 441/56 |
| 7,955,224 B2 | | 6/2011 | Curley | |
| 8,220,087 B2 | | 7/2012 | Villa et al. | |
| 8,317,660 B2 | | 11/2012 | Goranson | |
| 8,499,383 B1 | | 8/2013 | Ungaro | |
| 9,101,801 B2 | * | 8/2015 | Cohen | A63B 60/08 |
| 9,131,821 B2 | * | 9/2015 | Powell | A47L 13/16 |
| 2006/0053575 A1 | * | 3/2006 | Ragland | A47L 13/18 15/227 |
| 2007/0061986 A1 | * | 3/2007 | Huntington | A47L 13/18 15/227 |
| 2007/0174998 A1 | | 8/2007 | Powell | |
| 2008/0092269 A1 | | 4/2008 | Schox | |
| 2008/0229534 A1 | * | 9/2008 | Vossoughi | A47L 13/18 15/227 |
| 2008/0271224 A1 | * | 11/2008 | Wilbert | A41D 19/01523 2/161.1 |
| 2009/0247378 A1 | * | 10/2009 | Carlesimo | A63B 21/00047 482/141 |
| 2010/0031411 A1 | * | 2/2010 | Andrews | A41D 19/0017 2/20 |
| 2010/0071705 A1 | | 3/2010 | Alviso | |
| 2010/0287720 A1 | * | 11/2010 | Kayata, Sr. | A47K 7/03 15/227 |
| 2010/0299833 A1 | | 12/2010 | Kessler | |
| 2011/0005017 A1 | * | 1/2011 | Merriweather | A47L 13/19 15/227 |
| 2011/0072581 A1 | | 3/2011 | Villa et al. | |
| 2011/0167581 A1 | * | 7/2011 | Arzarzar | A47L 13/18 15/227 |
| 2012/0023632 A1 | * | 2/2012 | Provenzano | A41D 13/082 2/16 |
| 2012/0076981 A1 | | 3/2012 | Franks et al. | |
| 2012/0090073 A1 | * | 4/2012 | Chen | A63B 71/14 2/161.1 |
| 2012/0324645 A1 | * | 12/2012 | Lehr | A63B 21/4037 5/420 |
| 2013/0057006 A1 | * | 3/2013 | Vinciguerra | A47G 23/0625 294/172 |
| 2013/0252791 A1 | | 9/2013 | Chang | |
| 2013/0319625 A1 | * | 12/2013 | Mohammadi | D21H 27/02 162/111 |
| 2013/0324382 A1 | | 12/2013 | Wilson | |
| 2014/0000052 A1 | * | 1/2014 | Filho | A47L 13/18 15/227 |
| 2014/0135189 A1 | * | 5/2014 | Thomason | A63B 23/1236 482/141 |
| 2014/0259502 A1 | * | 9/2014 | Vitucci-Schneider | A47L 13/16 15/244.4 |
| 2014/0289987 A1 | * | 10/2014 | Filho | A47L 13/18 15/227 |

* cited by examiner

FIG. 9

# RESILIENT HAND PAD AND BLOCK SYSTEM FOR RELIEVING HAND AND WRIST STRESS, AND RELATED PAIN, DURING YOGA AND RELATED FLOOR-BASED POSES AND EXERCISES

FIELD OF THE INVENTION

The present disclosure generally relates to products for supporting a user's hands during floor-based exercising. More particularly, the present disclosure relates to a resilient hand form pad and block system constructed for supporting one or more hands during the process of a yoga or other floor-based posing and stretching exercise, in a manner that prevents hand slipping during the process, while significantly reducing stress typically felt on the hands and wrists of a user—particularly, a user having a preexisting condition or injury—during particular exercises, yoga poses and the like.

BACKGROUND OF THE INVENTION

In recent years, the yoga (and many other floor-based stretching and exercise practice) have proliferated at an incredible pace, particularly as individuals, both young and old, realize the profound health benefits. In general, yoga is a combined and integrated physical, mental, and spiritual practice or discipline. The origins of yoga speculatively date back many centuries to areas of Asia. The practice of yoga came to the attention of an educated Western public in the mid-19$^{th}$ century, along with related topics of Indian philosophy. Arguably, the current explosion in the popularity of yoga began in the 1980's, and is often practiced as a purely physical system of health exercises outside of and unconnected to any religious denomination.

There is also a significant physical exercise aspect to the practice of yoga. These physical exercises, which are beneficial for expanding the flexibility and range of motion of a practitioner's body, are typically practiced upon a relatively thin resilient mat supported upon a hard ground or floor surface, such as wood. Many of the movements and poses necessarily require utilization of one or both hands to support at least a portion of the practitioner's body, during body movements and during stationary poses. Unfortunately, for individuals having preexisting medical conditions and ailments, such as carpal tunnel syndrome, arthritis and physical injuries, for example, many floor-based exercises, yoga movements and poses, and the like, although performed on a mat can cause significant pain. As a result, many individuals, for whom yoga would be an incredibly useful tool for reducing, if not completely eliminating, the corresponding debilitating effects relating to various preexisting ailments, conditions, and injuries of the hands and wrists, are unable to practice yoga and other related floor-based exercises.

Another issue that is commonly encountered during yoga and other floor-based exercise practices is inadvertent slipping of the hands. In addition to placing a practitioner's palms on the surface of the floor or, more typically, a floor-covering mat, to support a portion of the body, combinations of lateral and longitudinal movement of the practitioner's body often place directional stresses on the hands, fingers and wrists, of the users that are typically only counteracted by the forces of friction between the mat surface and the portion of the user's hands in direct contact with the mat. However, this frictional contact and resistance for supporting the user's body during yoga exercise, or non-yoga specific related stretching and exercise movement, is often inadequate. The potential for hands slipping is further exacerbated by perspiration formed on the palms and sweat dripping off of the body and onto the underlying mat surface. This can cause undesirable hand slipping, which can result in the potential for serious hand, wrist, arm and other bodily injuries. Accordingly, there has been an ongoing effort, often by practitioner's themselves, to device products to minimize, and preferably avoid, hand slipping, as well as devices aimed at reducing stress on the hands and wrists. Still, there is a need for a single system that could effectively address both of these commonly encountered issues. It would be highly desirable to provide such a system that is lightweight, portable, easy to use, and lends itself to easy and efficient manufacture to enable the production of an affordable, cost-effective system. With regard to yoga, many individuals use so-called "yoga blocks," which are function as props to make individuals more comfortable and improve alignment. For example, blocks are great for standing poses in which one hand is on the floor, such as Ardha Chandrasana. The blocks provide a raised surface for the user to help get into postures safely and with proper alignment, allowing the user to experience the pose and its benefits even if the user's hamstrings or shoulders are tight. They help to make yoga accessible to beginners and those experiencing injury or other physical limitations. They can also help bring awareness to the body to feel how to properly engage and support muscles in a specific pose. Therefore, it would be highly desirable and incredibly beneficial to provide a system that not only includes a component that addresses hand slipping and painful pressure upon the hand and wrist, but also is adapted to be quickly and efficiently engaged with a resilient block component to provide the aforementioned added benefits of a yoga block.

SUMMARY OF THE INVENTION

The present disclosure provides a novel resilient hand pad and block system that addresses limitations, drawbacks and disadvantages, of existing devices by providing a portable, affordable, effective system that very effectively prevents hand slipping, significantly reduces hand and wrist stress, and can be optionally selectively-engaged with a system component for quick and easy conversion into a yoga block form.

The system is generally directed to a resilient hand pad for stabilizing and supporting on a floor or other surface the hand of a user during stationary and dynamic exercises, in manner substantially relieving stress that would otherwise normally be felt at various points and areas of the hand and wrist. The hand pad has a body including a top surface defining a debossed profile of a human hand for receiving therein the hand of a user, and a bottom surface having a slip-resistant texture.

In an aspect, the slip-resistant texture may take the form of a plurality of parallel corrugations.

In another aspect, the corrugations may be transverse to a longitudinal orientation of the debossed human hand profile.

In another aspect, the bottom surface may be coated, or otherwise have disposed thereon, a slip-resistance substance.

In another aspect, the debossed human hand profile may be defined by a substantially continuous deboss, or cavity, sidewall.

In another aspect, the sidewall may be concave.

In another aspect, the body may comprise a plurality of layers.

In another aspect, at least one layer defines a bottom layer formed or otherwise created with a slip-resistant substance.

In another aspect, the bottom layer may have a bottom surface formed or otherwise created as a plurality of parallel corrugations substantially transverse to a longitudinal orientation or otherwise created of the debossed human hand profile.

In another aspect, at least one layer may define an intermediate layer formed of a resilient material and include the debossed human hand profile.

In another aspect, at least one layer may define a top layer defining an aperture therethrough in the form of a human hand profile.

In another aspect, a loop may be provided affixed to a periphery of the body.

In another aspect, a hand pad for stabilizing and supporting on a floor or other surface the hand of a user during stationary and dynamic exercises comprises a body having a plurality of layers including a top layer defining an aperture therethrough in the form of a human hand profile, an intermediate layer bonded to a bottom of the top layer and having a top surface defining a debossed human hand profile in vertical registration with the human hand profile aperture of the top layer, and a bottom layer bonded to a bottom surface of the intermediate layer and having a bottom surface having a slip-resistant texture.

In another aspect, the slip-resistant texture may be a series of parallel corrugations.

In another aspect, the corrugations may be transverse to a longitudinal orientation of the debossed human hand profile.

In another aspect, the human hand profile aperture in the top layer may be defined by a substantially continuous aperture sidewall.

In another aspect, the aperture sidewall may be concave.

In another aspect, a loop may be affixed to a periphery of the body.

In a still further aspect, a hand pad system for stabilizing and supporting on a floor or other surface the hand of a user during stationary and dynamic exercises comprises at least one hand pad comprising a body having a plurality of layers including a top layer defining an aperture therethrough in the form of a human hand profile wherein the aperture has a substantially continuous concave sidewall, an intermediate layer bonded to a bottom of the top layer and having a top surface defining a debossed human hand profile in vertical registration with the human hand profile aperture of the top layer, and a bottom layer bonded to a bottom surface of the intermediate layer and having a bottom surface having a plurality of parallel corrugations. At least one block, or brick, is provided having a plurality of substantially planar sides, each side having a plurality of parallel corrugations wherein the parallel corrugations physically interlock with the bottom layer corrugations of the pad.

In another aspect, the bottom layer and the brick may be coated with a slip-resistant material.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
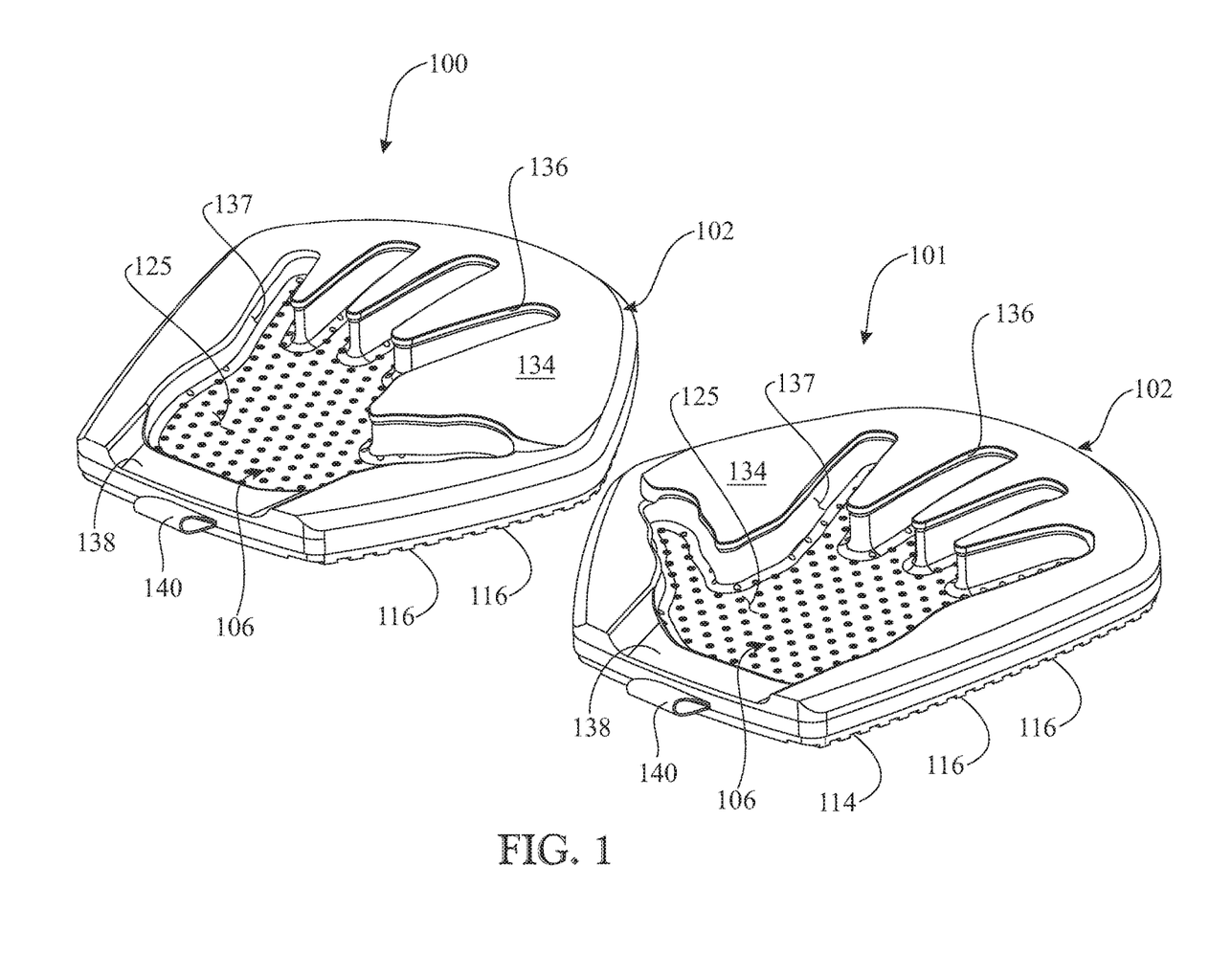
FIG. 1 presents an isometric view of a pair of resilient hand pads for use during yoga or any other floor-based exercise embodying the present invention.
Figure 2:
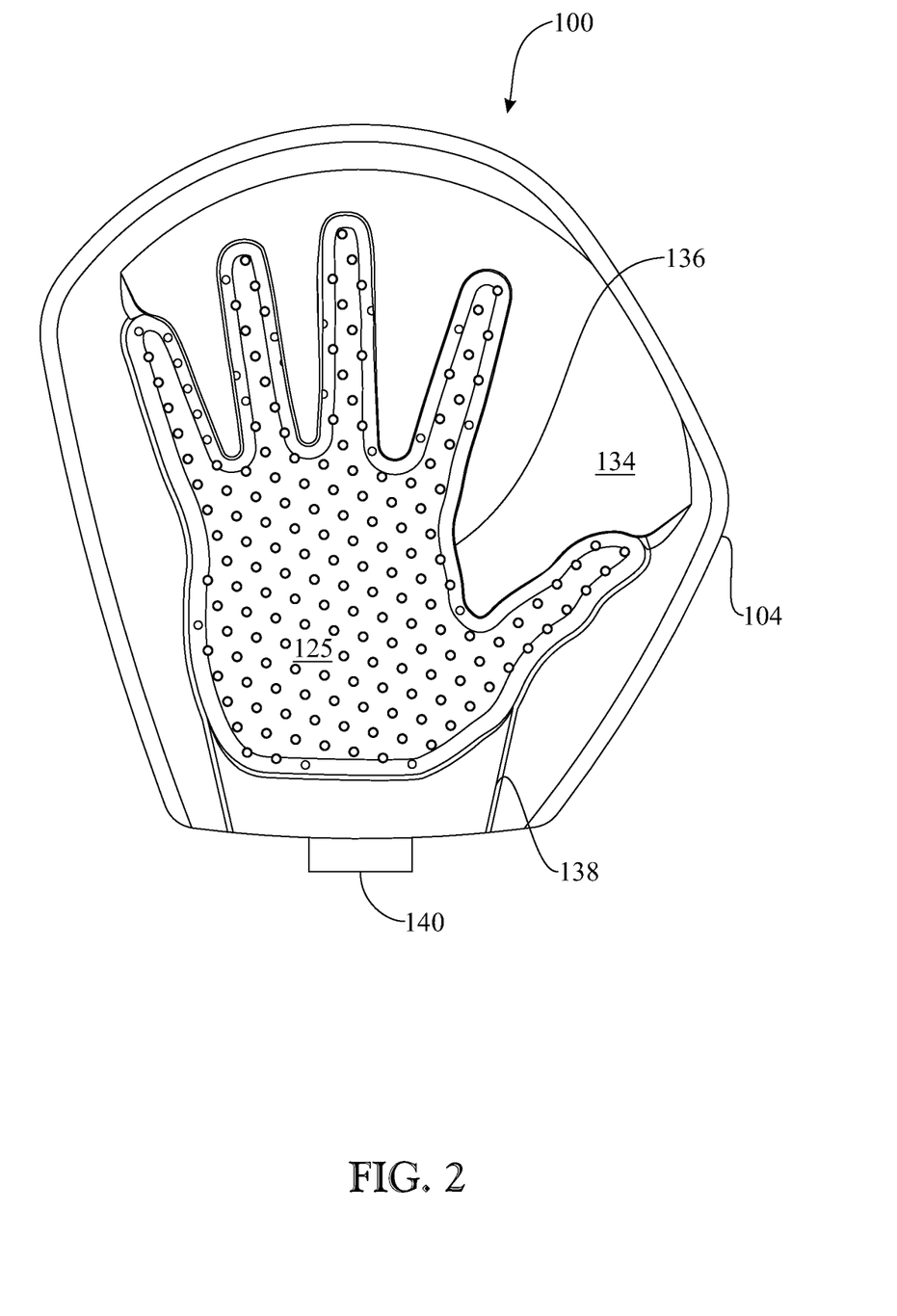
FIG. 2 presents a top plan view of the left hand pad according to the invention embodiment of FIG. 1.
Figure 3:
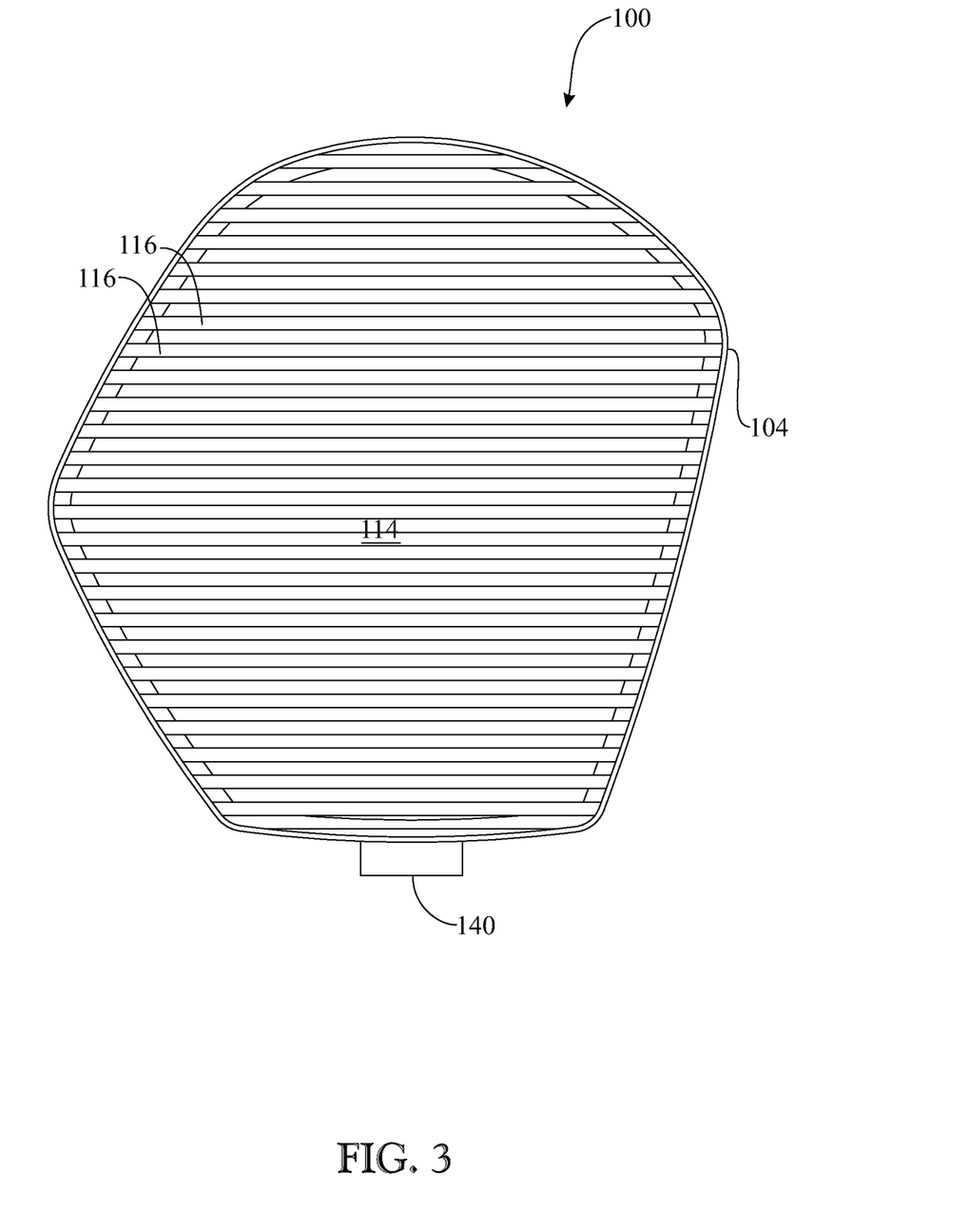
FIG. 3 presents a bottom plan view of the left hand pad of FIG. 2.
Figure 4:
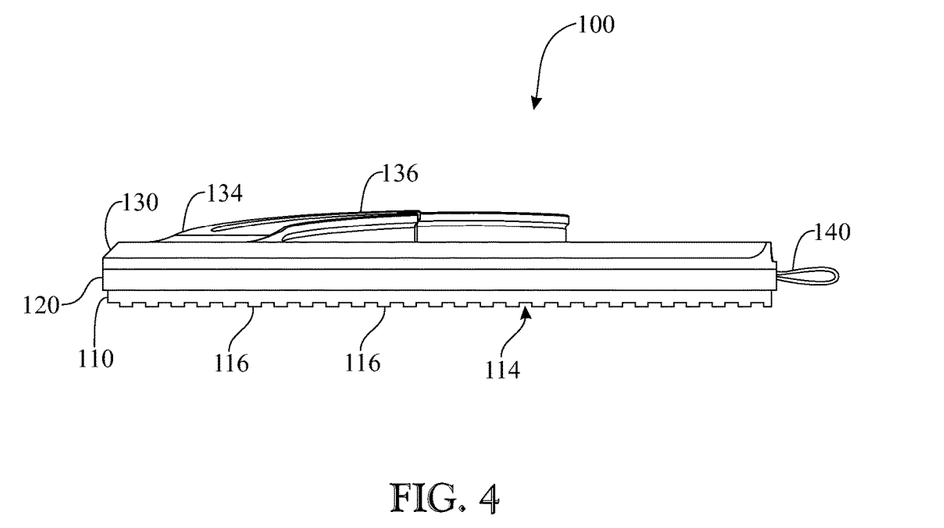
FIG. 4 presents a side elevation view of the left hand pad of FIG. 2.
Figure 5:
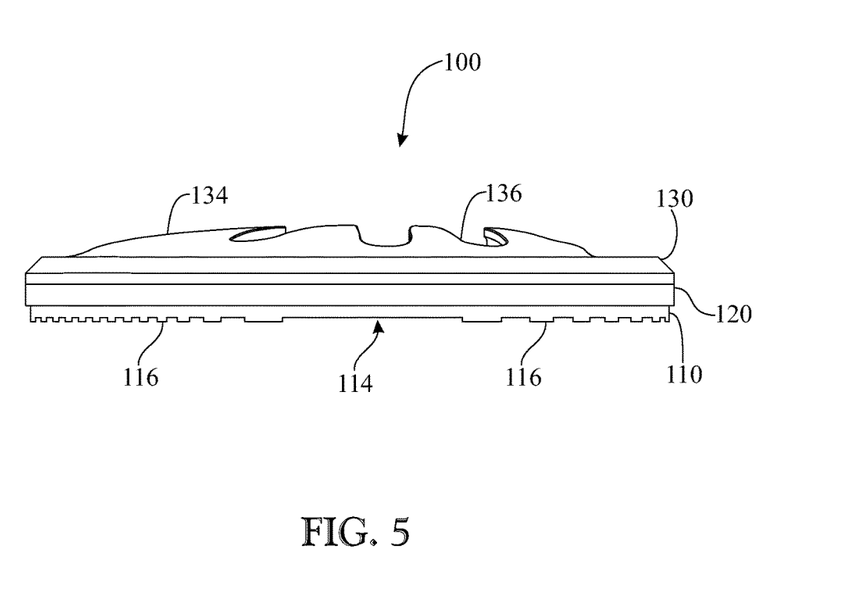
FIG. 5 presents an end elevation view of the left hand pad of FIG. 2.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-6, there is illustrated, in one exemplary implementation of the invention, a pair of resilient hand pads, generally designated 100, 101, provided for stabilizing and supporting on a floor or other surface the hands of a user during stationary and dynamic exercises, such as yoga exercises. Since the one hand pad 101 is a mirror image of the other hand pad 100 with their respective components being the same, only the components of the hand pad 100 will now be described while the reference numerals used to identify its components are applied to both hand pads. The hand pad 100 includes a multilayer resilient body 102 having a top surface 134, a bottom surface 114 being spaced from the top surface 134 and an exterior periphery 104 (FIGS. 2 and 3), which can be of a regular or an irregular shape, extending between and interconnecting the top and bottom surfaces. The hand pad 100 also includes a cavity 106 debossed in its body 102 in the profile of a palm and fingers of a human hand which enables the cavity 106 to receive the palm and fingers of a hand of a user therein. The cavity 106 extends into the hand pad body 102 from the top surface 134 thereof toward and short of the bottom surface 114 thereof. More particularly, the cavity 106 is formed by a bottom wall 125 debossed in the body 102 in the profile of the palm and fingers of the human hand, the bottom wall being disposed below and spaced from the top surface 134 of the body 102 and disposed above and spaced from the bottom surface 114 of the body. The cavity 106 also is formed by a sidewall 137 being continuous so as to peripherally surround the bottom wall 125 without interruption and being contiguous with the bottom wall 125 of the cavity 106 and the top surface 134 of the body 102 so as to extend between and interconnect the bottom wall of the cavity 106 and the top surface 134 of the body 102. The continuous and contiguous sidewall 137 defines an aperture 136 in the body 102 being of a peripherally-enclosed configuration in the profile of the palm and fingers of the human hand and in vertical registration with the bottom wall 125 so as to enable the palm and fingers of the hand of the user to be received through the hand profile aperture 136 and into a position in the cavity 106 on the bottom wall 125 thereof, as seen in FIG. 7, such that the continuous and contiguous sidewall 137 aids in retention of the palm and fingers of the user's hand in the hand profile aperture 136 while the user is using the hand pad 100 during stationary and dynamic exercises. The body 102 of the hand pad 100 can further include a wrist depression portion 138 adjacent to a base of the cavity 106 for accommodating the wrist of the user. Also, a lanyard 140 is affixed to the outer periphery 104 of the body 102 of the hand pad 100. The lanyard 140, which is preferably constructed from polyester, can be utilized to assist in hanging the hand pad 100 in a convenient storage location. The bottom surface 114 of the body 102 of the hand pad 100 preferably incorporates a slip-resistant texture which, in one exemplary implementation, comprises a plurality of parallel spaced-apart corrugations 116 that are transverse to a longitudinal orientation of the cavity 106 in the hand pad body 102.

Figure 6:
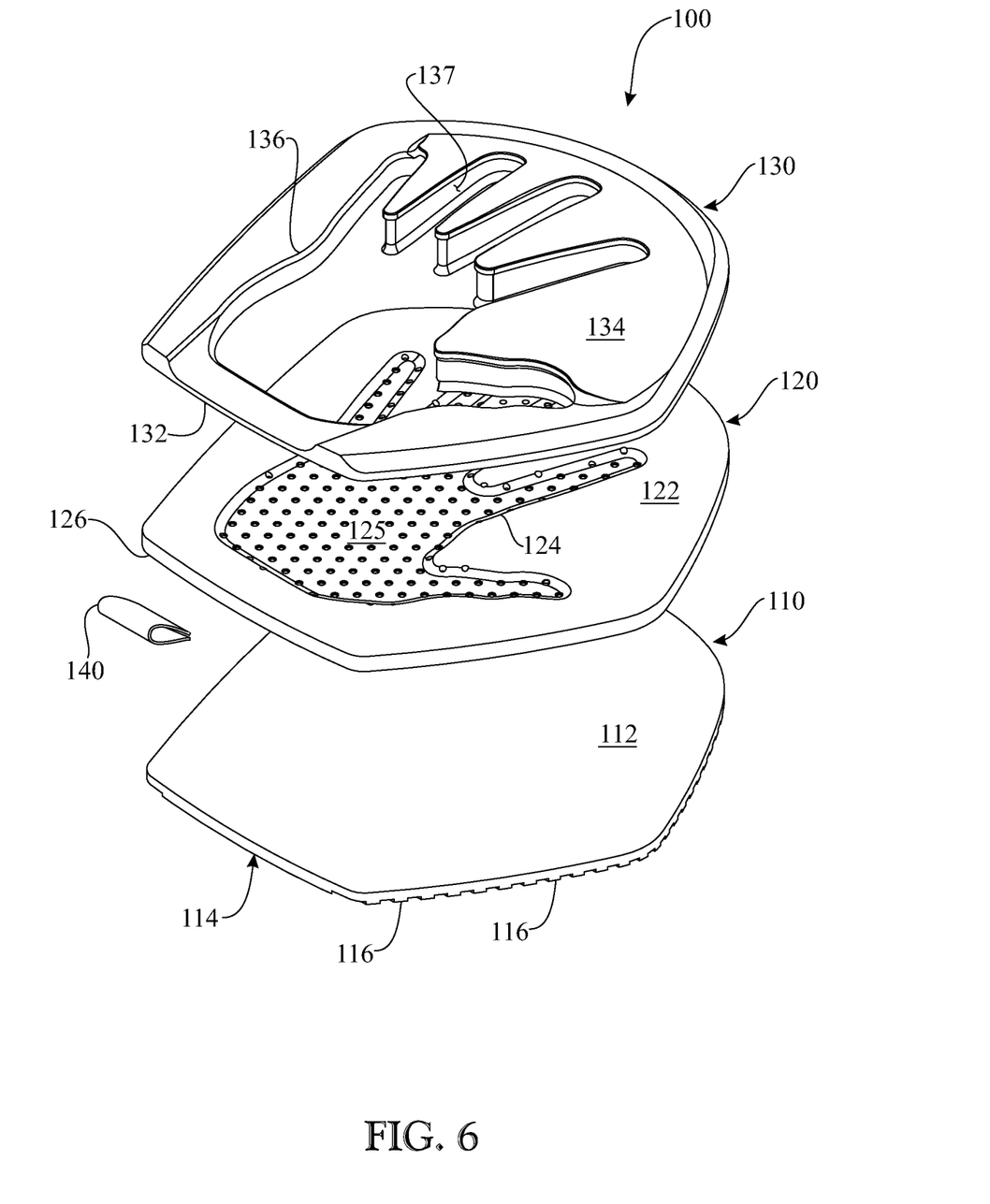
FIG. 6 presents an exploded isometric view of the left hand pad of FIG. 2 illustrating the various construction layers.
Figure 7:
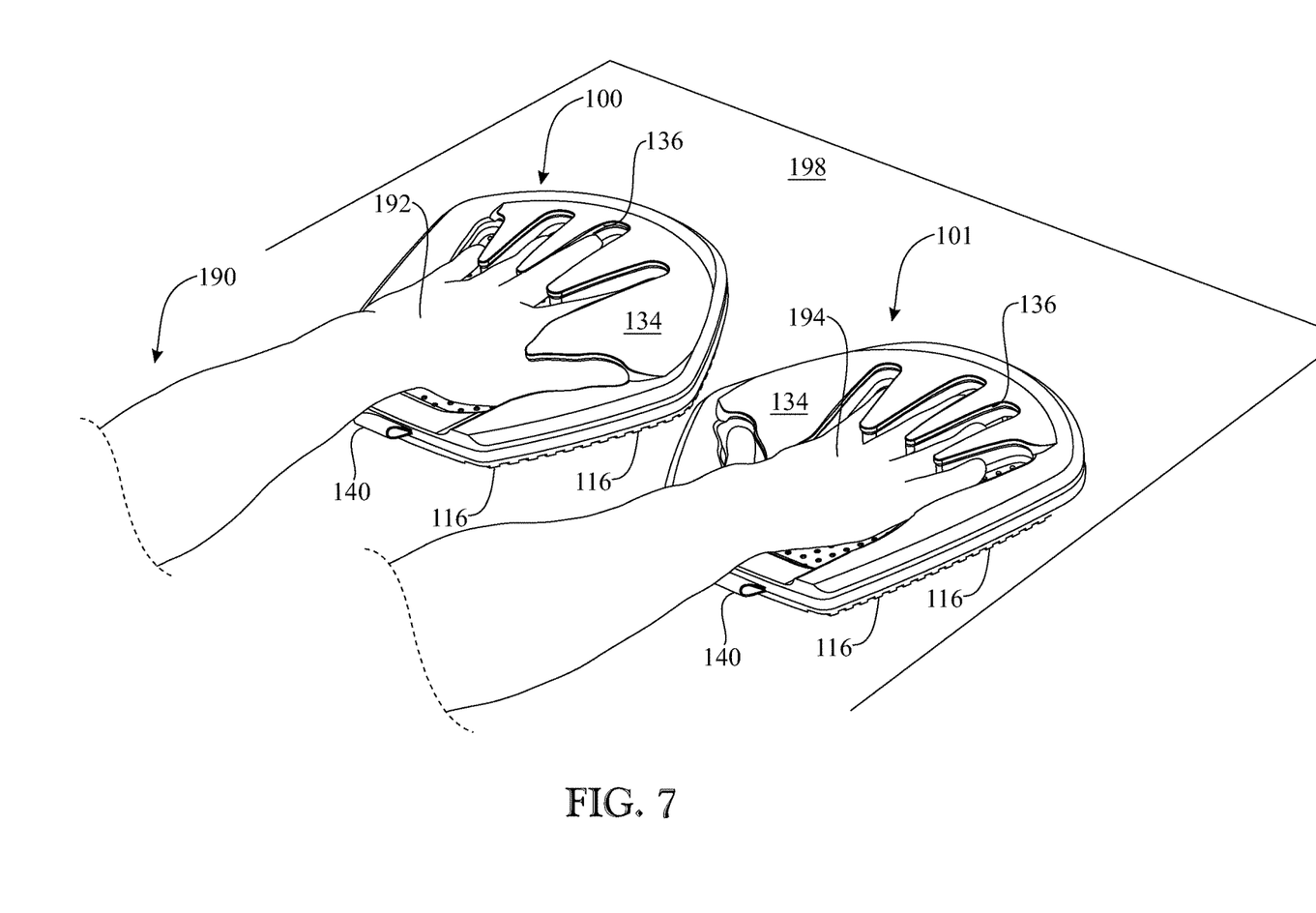
FIG. 7 presents a top isometric view of a user's hands engaged in the pair of hand pads according to FIG. 1, for example, while conducting yoga exercises.

As best illustrated in FIG. 6 the body 102 of the hand pad 100 can be comprised of a plurality of layers. A top layer 130 of the hand pad body 102 has the top surface 134 and the hand profile aperture 136 formed therethrough by the substantially continuous sidewall 137. The sidewall 137 can be vertically planar as illustrated, or can be concave (not shown) for receiving in the concavity a side portion of a user's fingers to aid in retention of a user's hand within the hand profile aperture 136. By way of example, the upper layer can be constructed from an expanded rubber, also referred to as a foam rubber (e.g., Ethylene-Vinyl Acetate (EVA) Thermo-Plastic Elastomer (TPE) foam), having a smooth outer surface, which is commonly used in the manufacture of yoga mats. EVA is preferably due to its light weight.

An intermediate layer 120 of the hand pad body 102 is formed of a resilient material, providing some give to effectively relieve stress against the hand and wrist, and has a debossment 124 defined in a top surface 122 of the intermediate layer 120 in the profile of the palm and fingers of a human hand. The debossment 124 forms the bottom wall 125 of the cavity 106 and accommodates supporting the palm and fingers of the user's hand, once received through the hand profile aperture 136, upon the bottom wall 125. The resilient nature of the intermediate layer 120 functions to cushion the user's hand during the performance of the stationary or dynamic exercises, thereby relieving pressure against the user's hand and wrist. The top surface 122 of the intermediate layer 120 is preferably bonded to the bottom surface 132 of the top layer 130 in a manner such that the cavity sidewall 137 of the human hand profile aperture 136 is in vertical registration with the cavity bottom wall 125. Preferably, the cavity bottom wall 125 has a dimpled, or golf ball like, surface, which may be constructed from neoprene, EVA foams with varying densities, etc., which has anti-sweat, water resistant and antimicrobial characteristics.

A bottom layer 110 of the hand pad body 102 is formed, or otherwise created, from a durable material for contacting a floor or other supporting ground surface (not shown in FIGS. 1-7) and has an upper surface 112 bonded to a bottom surface 126 of the intermediate layer 120. The bottom layer 110 can be constructed from a slip-resistant material or, alternatively, have a slip-resistant coating layer (not shown) applied to a bottom surface 114 thereof. Optionally, the bottom surface 114 may be provided having a plurality of corrugations 116 oriented transversely to the orientation of the cavity 106 or the human hand profile aperture 136 thereof. A lanyard 140, such as a fabric loop, is preferably affixed to and side edge of the body 102 of the hand pad 100 to aid in positioning the hand and wrist supporting pad 100, hanging the hand pad during storage of the hand pad when not in use (e.g., to allow it to dry), or any other lanyard use.

It is preferable that the three EVA foam layers 110, 120 and 130, are permanently attached, forming a laminate-like construction, using either a chemical adhesive or heat bonding the layers to one another.

Referring now particularly to FIG. 7, during use, the pair of hand pads 100, 101, being a left hand and wrist supporting pad and a mirror-image right hand and wrist supporting pad, are initially placed upon a support surface 198, which may, for example, be a ground, a floor or a mat supported upon a floor, etc. A user 190 then places the user's left hand 192 in the human hand form cavity 106 in the body 102 of the left hand pad 100, and in like manner places the user's right hand 194 in the human hand form cavity 106 in the body 102 of the right hand pad 101. The user can then perform the desired stationary or dynamic exercises while having her hands 192, 194 (and wrists) cushioned and supported by the body cavity bottom walls 125 of the hand and wrist stress-alleviating resilient intermediate layers 120, and securely limited against undesirable slipping along the bottom walls 125 not only by their slip-resistant dimpled anti-sweat, water resistant, antimicrobial surface construction, but by the continuous and contiguous interior sidewalls 137 of the human hand form cavities 106. Furthermore, the human hand profile apertures 136 help improve hand posture by spreading out the fingers of a user's hands when performing an exercise. This helps minimize injury by spreading the user's weight evenly throughout the wrists, arms, and shoulders. The slip-resistant nature of the bottom surface 114, such as corrugations 116, function to retain the hand pads 100, 101 in a stationary position, by frictionally-engagement with the particular resilient pad support surface during the act of exercising.

Figure 8:
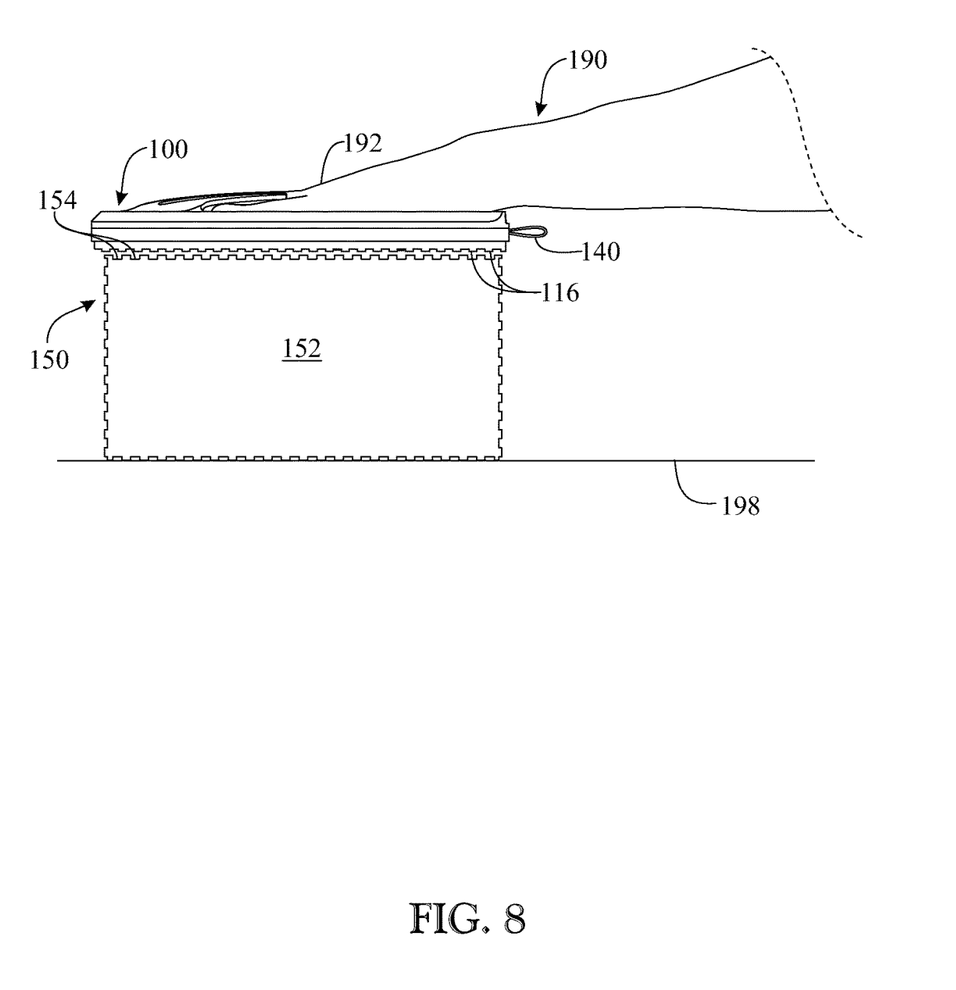
FIG. 8 presents a side elevation view of a further implementation of the system of the present invention, wherein a user's left hand is shown engaged in a left hand pad according to FIG. 2, and further utilizing an companion block, or brick, capable of being selectively engaged with the hand pad, for elevating the user's hand a distance above the floor surface, or floor mat surface where a mat is used, while also providing the benefits of maintaining minimal slippage with respect to the floor and reducing stress to the hand and wrist of the user.

Referring now particularly to FIG. 8, in a further implementation, the system 100 may incorporate a yoga block type component, shown generally as reference numeral 150, specifically constructed and configured for selective releasable locking engagement with a respective one of the resilient hand pads 100, 101. As previously described hereinabove, yoga blocks provide myriad benefits and are very commonly used—particularly by students having stretching or other body movement limitations. The block 150 is comprise of a unitary main body 152 having generally planar sides, wherein the top side, and preferably all of the sides, have a plurality of uniformly-spaced corrugations, including female corrugation portions, or channels 154, sized, positioned and shaped for selective locking engagement with a corresponding plurality of uniformly-spaced corrugations, including male corrugations portions 116, sized and shaped for being snugly received within block channels 154 on the bottom surface of the hand pads 100, 101. Preferably, a slip resistant coating layer is provided disposed upon a bottom surface of the block, providing the same function as the slip resistant coating layer application to the bottom surface of the resilient hand and wrist pads 100, 101. The block 150 is preferably substantially rigid to elevate the hand pads 100, 101 above the floor or ground surface 198, thereby effectively creating an assembly combining the previously described benefits, well known to those skilled in the yoga arts, of a conventional yoga block with the benefits of the features of the unique resilient hand support pad components of the present system.

Figure 9:
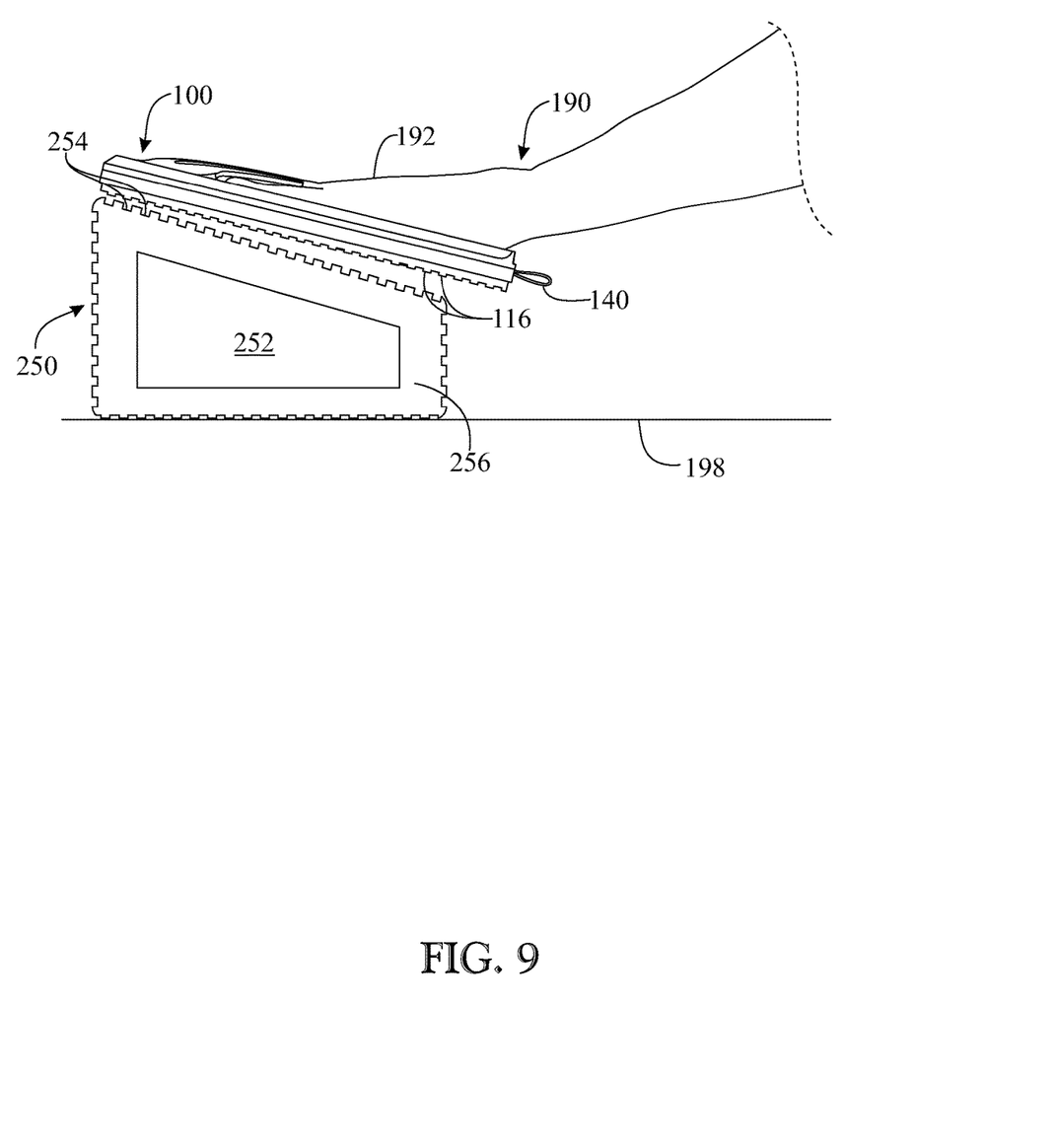
FIG. 9 presents a side elevation view of a further implementation of the system of the present invention, wherein a user's left hand is shown engaged in a left hand pad according to FIG. 2, and further utilizing a tapered companion block, capable of being selectively engaged with the hand pad, for elevating the user's hand a distance above the floor surface, or floor mat surface where a mat is used, while also providing the benefits of maintaining minimal slippage with respect to the floor and reducing stress to the hand and wrist of the user.

Although the block body 152 is shown in FIG. 8 having a rectilinear geometry, it will be apparent to those skilled in the art that other geometries are contemplated. For example, as best illustrated in FIG. 9, it may be desirable to provide a block 250, with a smooth EVA TPE foam core 252, surrounded by a corrugated EVA TPE foam layer 256, having a tapered, or inclined, upper surface, incorporating a corrugated surface, or channels 254, similar to those provided in the upper surface of block 152 in FIG. 8. In this manner, the resilient hand and wrist support pads 100, 101 could be configured for selective locking engagement with the inclined block upper surface to impart an incline in the resilient pad vis-à-vis a pad support surface.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:
1. A hand pad for stabilizing and supporting on a floor or other surface a hand of a user during stationary and dynamic exercises, said hand pad comprising:
 a body having a top surface and a bottom surface of a slip-resistant texture and being spaced from said top surface; and
 a cavity debossed in said body in a profile of a palm and fingers of a human hand, said cavity extending into said body from said top surface of said body toward and short of said bottom surface of said body, said cavity being formed by a bottom wall debossed in the body in the profile of the palm and fingers of the human hand, said bottom wall being disposed below and spaced from said top surface of said body and disposed above and spaced from said bottom surface of said body, said cavity also being formed by a sidewall being continuous so as to peripherally surround said bottom wall without interruption and being contiguous with said bottom wall of said cavity and said top surface of said body so as to extend between and interconnect said bottom wall of said cavity and said top surface of said body, said continuous and contiguous sidewall defining an aperture in said body being of a peripherally-enclosed configuration in the profile of the palm and fingers of the human hand and in vertical registration with said bottom wall so as to enable the palm and fingers of a hand of a user to be received through said aperture and onto said bottom wall in said cavity such that said continuous and contiguous sidewall aids in retention of the palm and fingers of the hand of the user in said aperture while the user is using said hand pad during stationary and dynamic exercises.

2. The hand pad according to claim 1 wherein said slip-resistant texture of said bottom surface of said body is a plurality of parallel corrugations.

3. The hand pad according to claim 2 wherein said corrugations are transverse to a longitudinal orientation of said cavity in said body.

4. The hand pad according to claim 1 wherein said bottom surface of said body is coated with a slip-resistant substance.

5. The hand pad according to claim 1 wherein said continuous sidewall of said cavity is concave between said bottom wall of said cavity and said top surface of said body.

6. The hand pad according to claim 1 wherein said body comprises a plurality of layers.

7. The hand pad according to claim 6 wherein at least one layer is a bottom layer, said bottom layer being formed of a slip-resistant substance.

8. The hand pad according to claim 7 wherein said bottom layer has said bottom surface of said body being formed as a plurality of parallel corrugations substantially transverse to a longitudinal orientation of said cavity in said body.

9. The hand pad according to claim 6 wherein at least one layer is an intermediate layer formed of a resilient material and including said bottom wall of said cavity.

10. The hand pad according to claim 6 wherein at least one layer is a top layer including said continuous and contiguous sidewall of said peripherally-enclosed aperture of said cavity.

11. The hand pad according to claim 1 including a loop affixed to a periphery of said body.

12. A hand pad for stabilizing and supporting on a floor or other surface a hand of a user during stationary and dynamic exercises, said hand pad comprising:
 a body having a plurality of layers including:
  a top layer defining an aperture therethrough in the form of a human hand profile;
  an intermediate layer bonded to a bottom of said top layer and having a top surface defining a debossed human hand profile in vertical registration with said human hand profile aperture of said top layer; and a bottom layer bonded to a bottom surface of said intermediate layer, said bottom layer having a bottom surface having a slip-resistant texture.

13. The hand pad according to claim 12 wherein said slip-resistant texture is a series of parallel corrugations.

14. The hand pad according to claim 13 wherein said corrugations are transverse to a longitudinal orientation of said debossed human hand profile.

15. The hand pad according to claim 12 wherein said human hand profile aperture in said top layer is defined by a substantially continuous aperture sidewall.

16. The hand pad according to claim 12 wherein said aperture sidewall is concave.

17. The hand pad according to claim 12 including a loop affixed to a periphery of said body.

18. A hand pad system for stabilizing and supporting on a floor or other surface a hand of a user during stationary and dynamic exercises, said hand pad system comprising:
   at least one hand pad comprising a body having a plurality of layers including:
      a top layer defining an aperture therethrough in the form of a human hand profile said aperture having a substantially continuous concave sidewall;
      an intermediate layer bonded to a bottom of said top layer and having a top surface defining a debossed human hand profile in vertical registration with said human hand profile aperture of said top layer; and
      a bottom layer bonded to a bottom surface of said intermediate layer, said bottom layer having a bottom surface having a slip-resistant texture being a plurality of parallel corrugations; and
   at least one block having a plurality of substantially planar sides, each side having a plurality of parallel corrugations, said parallel corrugations physically interlocking with said bottom layer corrugations of said pad.

19. The hand pad system according to claim 18 wherein said bottom layer and said block are coated with said slip-resistant material.

20. The hand pad according to claim 1 further comprising a block having a plurality of substantially planar sides, an upper one of which being disposed beneath and contacting said bottom surface of said body so as to elevate and support said body above the floor or other surface.

21. The hand pad according to claim 20 wherein said upper one of said planar sides of said block is inclined so as to elevate and support said body above and at an angle to the floor or other surface.

\* \* \* \* \*